United States Patent
Namba et al.

(10) Patent No.: US 12,309,488 B2
(45) Date of Patent: May 20, 2025

(54) TRAVELING ENVIRONMENT RECOGNITION APPARATUS

(71) Applicant: SUBARU CORPORATION, Tokyo (JP)

(72) Inventors: Ryosuke Namba, Tokyo (JP); Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 366 days.

(21) Appl. No.: 17/578,901

(22) Filed: Jan. 19, 2022

(65) Prior Publication Data

US 2022/0256082 A1    Aug. 11, 2022

(30) Foreign Application Priority Data

Feb. 9, 2021   (JP) .................................. 2021-019217

(51) Int. Cl.
*H04N 23/667*   (2023.01)
*G01C 21/30*    (2006.01)
(Continued)

(52) U.S. Cl.
CPC .......... *H04N 23/667* (2023.01); *G01C 21/30* (2013.01); *G06T 7/20* (2013.01); *G06T 7/70* (2017.01);
(Continued)

(58) Field of Classification Search
None
See application file for complete search history.

(56) References Cited

U.S. PATENT DOCUMENTS

| 9,852,357 | B2 * | 12/2017 | Zhang | G06V 20/588 |
| 2010/0185390 | A1 * | 7/2010 | Monde | G01C 21/26 |
|  |  |  |  | 701/532 |
| 2016/0312446 | A1 * | 10/2016 | Pettersson | E02F 3/76 |

FOREIGN PATENT DOCUMENTS

| JP | 2009-121845 A | 6/2009 |
| JP | 2010-249641 A | 11/2010 |
| JP | 2019-172113 A | 10/2019 |

OTHER PUBLICATIONS

Office Action dated Jun. 25, 2024, from corresponding JP Application No. 2021-019217, 3 pages.

* cited by examiner

*Primary Examiner* — Matthew Ell
*Assistant Examiner* — David V Luu
(74) *Attorney, Agent, or Firm* — Rimon P.C.

(57) ABSTRACT

A traveling environment recognition apparatus includes a camera, a first traveling environment recognition unit, a second traveling environment recognition unit, and an imaging mode switching unit. The first traveling environment recognition unit calculates the movement amount of a vehicle on the basis of an optical flow in an image captured by the camera. The second traveling environment recognition unit calculates a vehicle position in the real space on the basis of positioning signals received from positioning satellites. The imaging mode switching unit drives the camera in a first imaging mode when positioning accuracy based on the positioning signals is high, while the imaging mode switching unit drives in a second imaging mode when the positioning accuracy is low. When the camera is driven in the second imaging mode, the second traveling environment recognition unit estimates the vehicle position on a road map based on the movement amount.

9 Claims, 5 Drawing Sheets

(51) Int. Cl.
*G06T 7/20* (2017.01)
*G06T 7/70* (2017.01)
*G06V 10/98* (2022.01)
*G06V 20/56* (2022.01)

(52) U.S. Cl.
CPC .............. *G06V 10/98* (2022.01); *G06V 20/56* (2022.01); *G06T 2207/30252* (2013.01)

TRAVELING ENVIRONMENT RECOGNITION APPARATUS

CROSS-REFERENCE TO RELATED APPLICATIONS

The present application claims priority from Japanese Patent Application No. 2021-019217 filed on Feb. 9, 2021, the entire contents of which are hereby incorporated by reference.

BACKGROUND

The technology relates to a traveling environment recognition apparatus.

Recently, traveling control apparatuses that assist driver's driving operations have been put into practical use to reduce driving loads on drivers of vehicles, such as automobiles, and enhance safety in driving. For these traveling control apparatuses, various techniques for causing a vehicle to travel in some traveling control modes. In one traveling control mode, steering assist control and acceleration/deceleration control are performed on the assumption that the driver independently performs driving operations. In another traveling control mode (a so-called automatic drive mode), the vehicle is caused to travel without requiring a driver's driving operation. Reference is made to Japanese Unexamined Patent Application Publication No. 2019-172113, for example.

SUMMARY

An aspect of the technology provides a traveling environment recognition apparatus to be applied to a vehicle. The traveling environment recognition apparatus includes a camera, a first traveling environment recognition unit, a second traveling environment recognition unit, and an imaging mode switching unit. The camera is configured to be driven in a first imaging mode or a second imaging mode having a higher frame rate than the first imaging mode, and capture an image of a traveling environment surrounding the vehicle. The first traveling environment recognition unit is configured to acquire first traveling environment information on the traveling environment surrounding the vehicle on the basis of the image captured by the camera, and calculate the movement amount of the vehicle on the basis of an optical flow in the image. The second traveling environment recognition unit is configured to calculate position coordinates of the vehicle in the real space on the basis of positioning signals received from positioning satellites, estimate a position of the vehicle on a road map on the basis of the position coordinates, and acquire second traveling environment information on the traveling environment surrounding the vehicle from road map information. The imaging mode switching unit is configured to assess the positioning accuracy based on the positioning signals. In a case where the positioning accuracy is high, the imaging mode switching unit is configured to drive the camera in the first imaging mode. In a case where the positioning accuracy is low, the imaging mode switching unit is configured to drive the camera in the second imaging mode. In a case where the camera is driven in the second imaging mode, the second traveling environment recognition unit is configured to estimate the position of the vehicle on the road map on the basis of the movement amount of the vehicle calculated on the basis of the optical flow.

An aspect of the technology provides a traveling environment recognition apparatus to be applied to a vehicle. The traveling environment recognition apparatus includes a camera and circuitry. The camera is configured to be driven in a first imaging mode or a second imaging mode having a higher frame rate than the first imaging mode, and capture an image of a traveling environment surrounding the vehicle. The circuitry is configured to acquire first traveling environment information on the traveling environment surrounding the vehicle on the basis of the image captured by a camera; calculate a movement amount of the vehicle on the basis of an optical flow in the image. The circuitry is configured to calculate position coordinates of the vehicle in the real space on the basis of positioning signals received from positioning satellites. The circuitry is configured to estimate a position of the vehicle on a road map on the basis of the position coordinates. The circuitry is configured to acquire second traveling environment information on the traveling environment surrounding the vehicle from road map information. The circuitry is configured to assess positioning accuracy based on the positioning signals. The circuitry is configured to drive the camera in the first imaging mode in a case where the positioning accuracy is high. The circuitry is configured to drive the camera in the second imaging mode in a case where the positioning accuracy is low. The circuitry is configured to estimate the position of the vehicle on the road map on the basis of the movement amount of the vehicle calculated on the basis of the optical flow in a case where the camera is driven in the second imaging mode.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
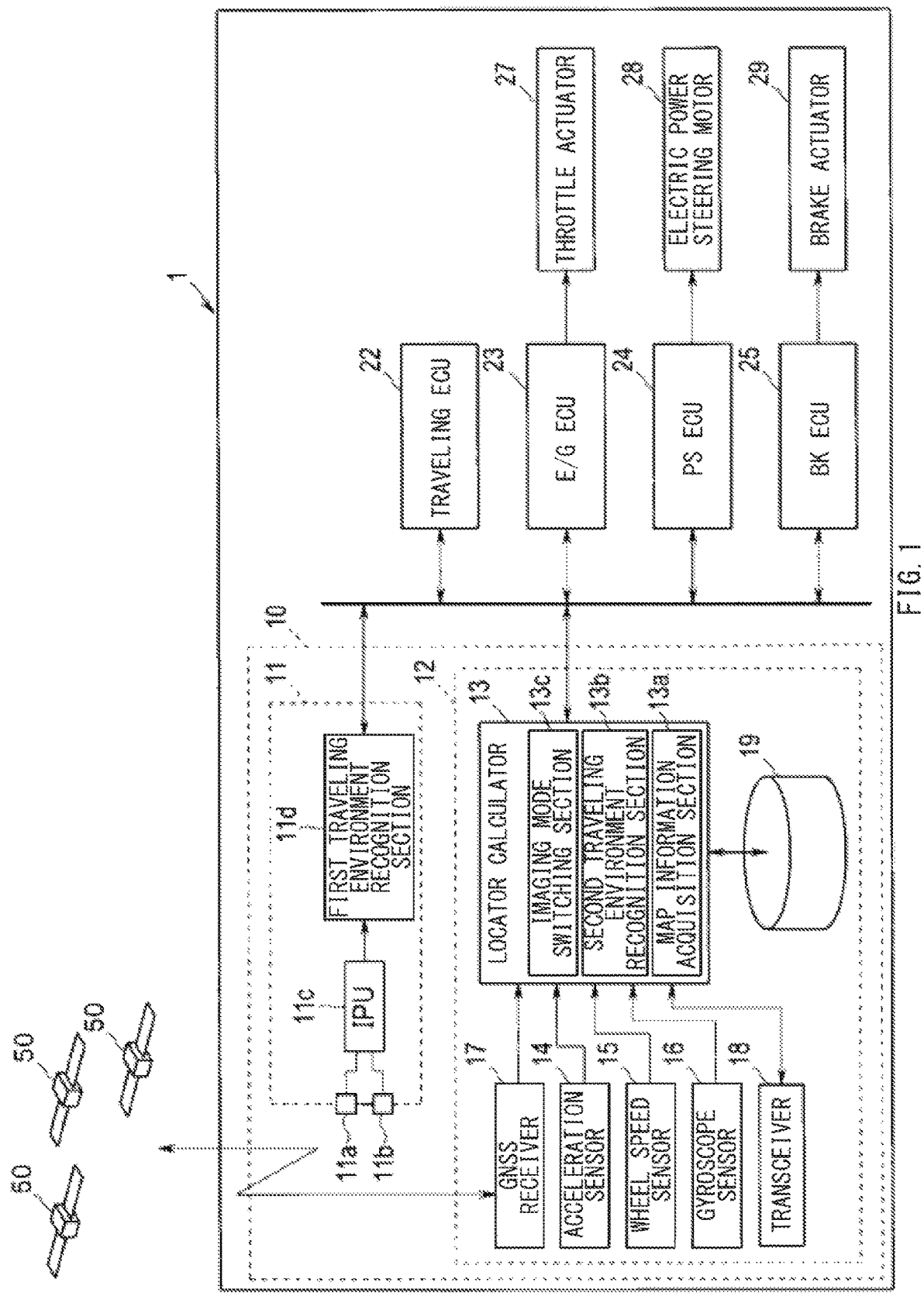
FIG. 1 is a block diagram illustrating an exemplary overall configuration of a traveling control system according to an example embodiment of the technology.

To achieve the traveling control, a traveling control apparatus basically includes an adaptive cruise control (ACC) function and an active lane keep centering (ACC) function, for example. The traveling control apparatus having these functions achieves traveling control that causes a vehicle to automatically travel along a traveling lane while keeping an inter-vehicular distance from a preceding vehicle.

To perform the traveling control with high accuracy, it is essential to recognize information on a traveling environment surrounding the own vehicle with high accuracy. A typical traveling environment recognition unit included in the traveling control apparatus estimates the position of the own vehicle on a road map on the basis of positioning signals received from positioning satellites, acquires information on the traveling environment from road map data on the basis of the estimated position of the own vehicle, and recognizes information on the traveling environment in the real space using an autonomous sensor, such as a camera.

For example, in a case where the positioning signals are blocked when the own vehicle enters a tunnel or in a case where the positioning signals generate multipath effects while the own vehicle is traveling through a high-rise building street, the positioning accuracy in estimating the own vehicle position can be lowered (or the estimation of the own vehicle position can be disabled). Such a decrease in the positioning accuracy can cause a decrease in the accuracy in acquiring the traveling environment information from the road map data, and hinder the traveling control from being appropriately performed.

One possible measure to address such a concern is to calculate the movement amount of the own vehicle on the basis of information received from a gyroscope sensor and a vehicle speed sensor, and estimate the own vehicle position on the road map on the basis of the movement amount of the own vehicle. Such an estimation of the own vehicle position is effective for short-distance traveling after the decrease in the accuracy in acquiring the traveling environment information; however, as the traveling distance increases, estimation errors can accumulate.

It is desirable to provide a traveling environment recognition apparatus that estimates an own vehicle position on a road map with high accuracy even when the positioning accuracy in estimating the own vehicle position on the basis of positioning signals received from positioning satellites is lowered.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 illustrates an exemplary overall configuration of a traveling control system 1 according to an example embodiment of the technology. As illustrated in FIG. 1, the traveling control system 1 may include a traveling environment recognition apparatus 10. The traveling environment recognition apparatus 10 recognizes a traveling environment surrounding an own vehicle M. The traveling environment recognition apparatus 10 may include a camera unit 11 and a locator unit 12.

The traveling control system 1 may further include a traveling control unit (hereinafter referred to as a traveling ECU) 22, an engine control unit (hereinafter referred to as an E/G ECU) 23, a power steering control unit (hereinafter referred to as a PS ECU) 24, and a brake control unit (hereinafter referred to as a BK ECU) 25. These control units 22 to 25 may be coupled to the camera unit 11 and the locator unit 12 via an in-vehicle communication line, such as a controller area network (CAN), for example.

The camera unit 11 may be fixed on an upper central portion of the vehicle interior compartment, for example. The camera unit 11 may include an in-vehicle stereo camera that includes a main camera 11a and a sub-camera 11b, an image processing unit (IPU) 11c, and a first traveling environment recognition section 11d. In one embodiment, the main camera 11a and the sub-camera 11b may serve as a "camera".

The main camera 11a and the sub-camera 11b may be, for example, autonomous sensors that detects the real space in front of the own vehicle M. The main camera 11a and the sub-camera 11b may capture an image at a synchronized timing. The main camera 11a and the sub-camera 11b may be disposed symmetrically about the middle of the width of the own vehicle M, and perform stereo imaging of a region Af in front of the own vehicle M (see FIG. 2) from different directions.

The main camera 11a and the sub-camera 11b may be high-speed cameras that capture images at 300 frames per second (300 [f/s]), for example. In this example embodiment, the frame rates of the main camera 11a and the sub-camera 11b may be switchable among multiple stages (e.g., two stages). For example, the imaging modes of the main camera 11a and the sub-camera 11b may be switchable between a normal imaging mode and a high-speed imaging mode. In the normal imaging mode, the main camera 11a and the sub-camera 11b may capture images at 30 to 60 frames per second (30-60 [f/s]). In one embodiment, the normal imaging mode may serve as a "first imaging mode". In the high-speed imaging mode, the main camera 11a and the sub-camera 11b may capture images at 300 frames per second (300 [f/s]). In one embodiment, the high-speed imaging mode may serve as a "second imaging mode".

The IPU 11c may perform predetermined image processing on the image of the traveling environment in front of the own vehicle M acquired by the main camera 11a and the sub-camera 11b to generate front traveling environment image information. The front traveling environment image information may include distance data calculated from the positional deviation of an identical object. The front traveling environment image information may be hereinafter referred to as distance image data.

The first traveling environment recognition section 11d may recognize traveling environment information on the traveling environment surrounding the own vehicle M on the basis of the distance image data received from the IPU 11c. In one embodiment, the traveling environment information acquired by the first traveling environment recognition section 11d may serve as "first traveling environment information".

For example, the first traveling environment information acquired by the first traveling environment recognition section 11d may include information on lane dividing lines, stop lines, and various attention-calling traffic marks provided on a road acquired from the distance image data.

Additionally, the first traveling environment recognition section 11d may calculate, as the first traveling environment information, the road curvatures [1/m] of the left and right lane dividing lines of the traveling road on which the own vehicle M is traveling (hereinafter referred to as an own vehicle traveling lane) and the width between the left and right lane dividing lines. The road curvature and the lane width may be calculated by various known methods. For example, the first traveling environment recognition section 11*d* may recognize the left and right lane dividing lines by performing binarization processing on the front traveling environment image information on the basis of luminance differences, and calculating the curvatures of the left and right lane dividing lines per predetermined section using curve approximation based on a least squares method.

Further, the first traveling environment recognition section 11*d* may perform predetermined pattern matching on the distance image data to acquire the first traveling environment information on guard rails, curbstones, and buildings provided along the road, and three-dimensional objects, such as pedestrians, two-wheel vehicles, and vehicles other than two-wheel vehicles, present on the road around the own vehicle M. To identify a three-dimensional object, the first traveling environment recognition section 11*d* may recognize the type of the three-dimensional object, the distance to the three-dimensional object, the speed of the three dimensional object, and the relative speed between the three-dimensional object and the own vehicle M, for example.

Figure 2:
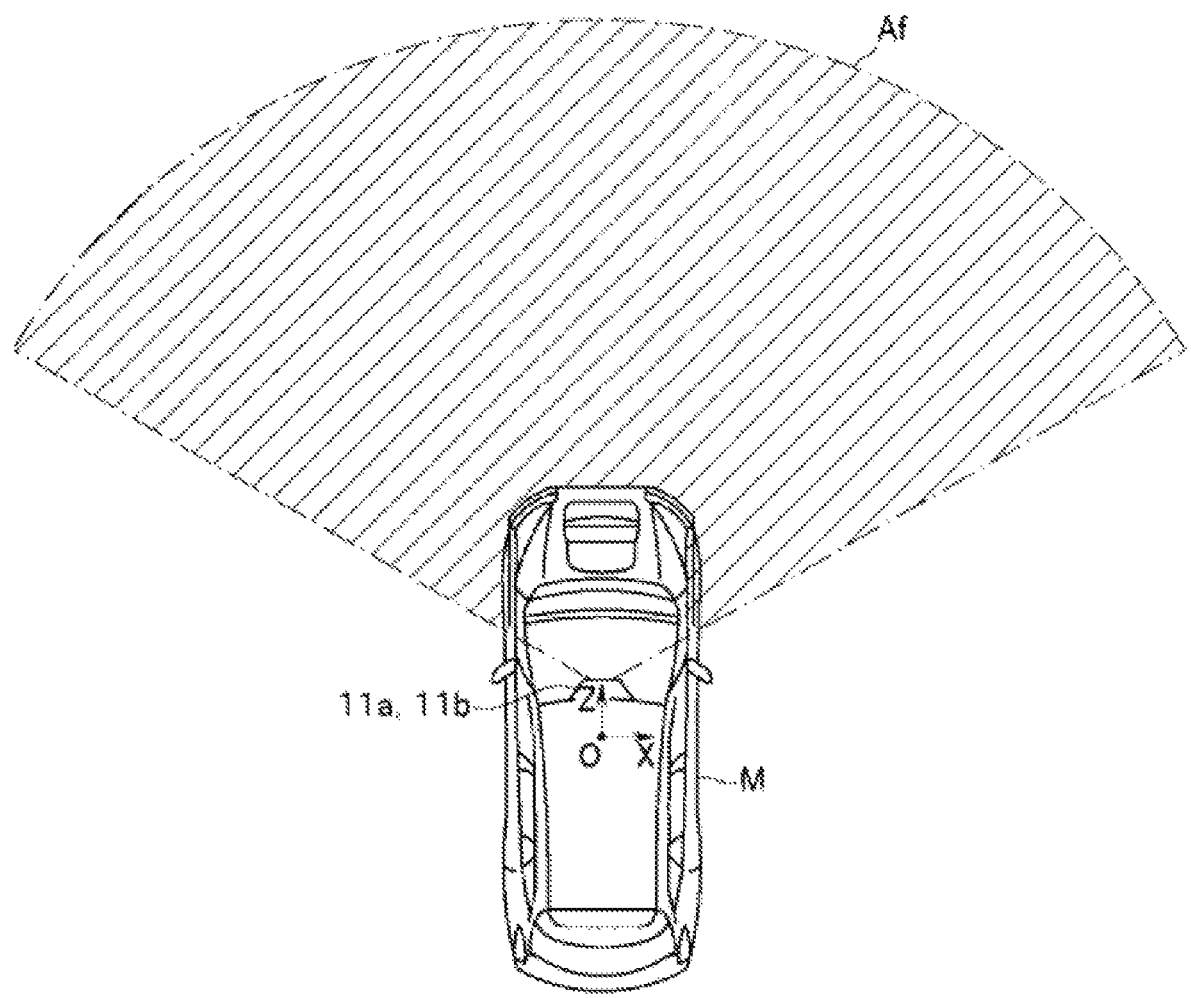
FIG. 2 is an explanatory diagram illustrating an exemplary imaging region of a stereo camera and a Cartesian coordinate system having a point of origin at the center of an own vehicle.

The first traveling environment recognition section 11*d* may convert the first traveling environment information (e.g., the information on the lane dividing lines or various three-dimensional objects) acquired as described above into a Cartesian coordinate system having a point of origin O at the center of the own vehicle M. The coordinate system has a Z-axis along the length of the own vehicle M, and an X-axis along the width of the own vehicle M, as illustrated in FIG. 2.

The first traveling environment recognition section 11*d* may further calculate the movement amount of the own vehicle M on the basis of the optical flows of one or more characteristic points of a static object identified on the road or around the road. For example, the first traveling environment recognition section 11*d* may calculate the movement amount (including the moving direction) of the own vehicle M by calculating the movement amount of an identical characteristic point between frames (i.e., the relative movement amount with respect to the own vehicle M) and calculating the relative movement amount backward.

Examples of the static object identified on the road may include lane dividing lines, stop lines, or various attention-calling traffic marks provided on the road. Examples of the static object identified around the road may include buildings, guard rails, and curbstones provided along the road.

Examples of the characteristic points of the static object may include edge points at the corners of the static object described above.

Figure 5:
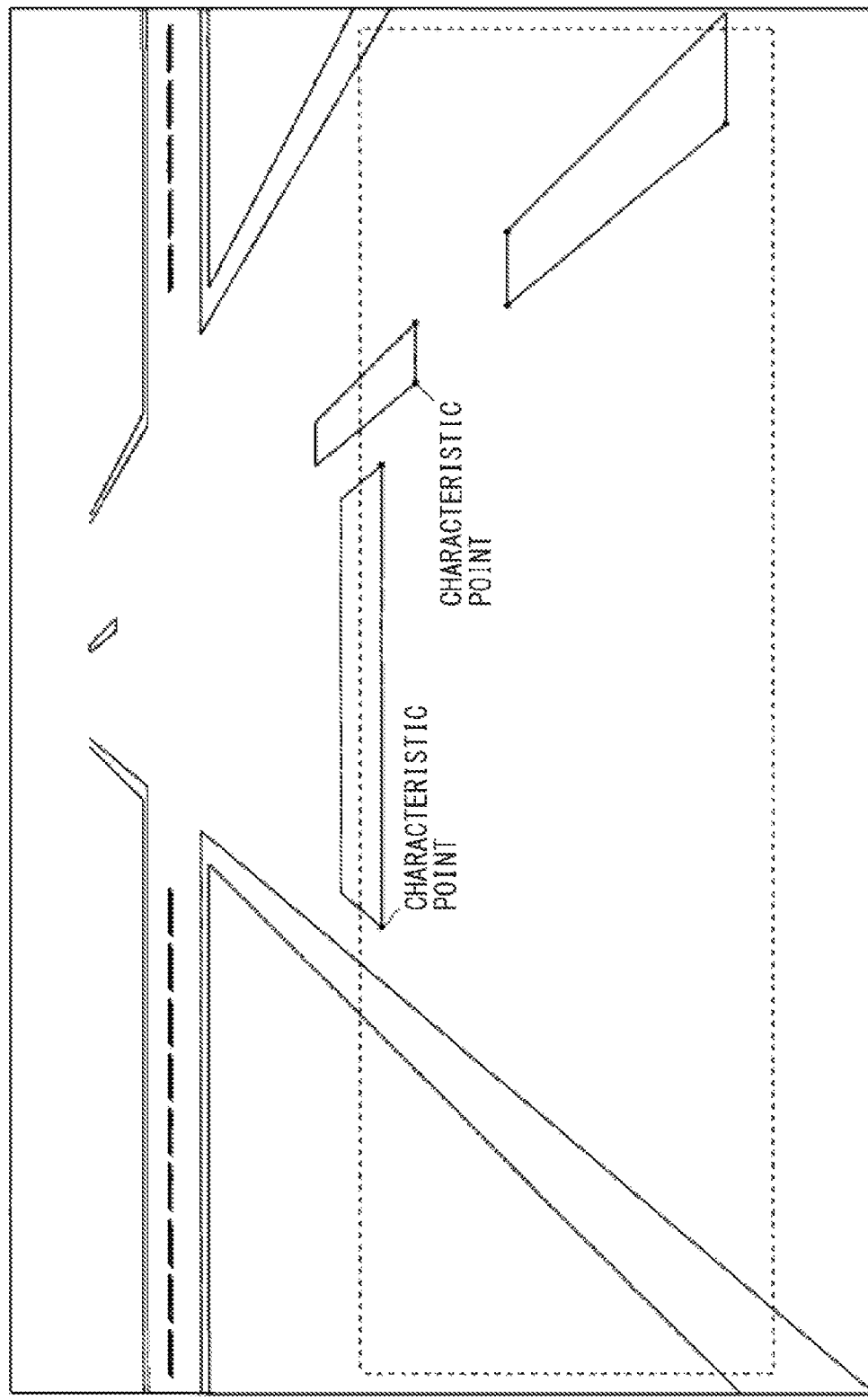
FIG. 5 is an explanatory diagram illustrating an exemplary image region in which the movement amount of the own vehicle is calculated on the basis of optical flows.

The characteristic points may be extracted from an image region in which the relative distance between the static object and the own vehicle M is detected with high accuracy. For example, the characteristic points may be extracted from a region near the own vehicle M (e.g., a region surrounded by a broken line in FIG. 5 at the lower portion of the image).

In one embodiment, the first traveling environment recognition section 11*d* may serve as a "first traveling environment recognition unit".

The locator unit 12 may estimate the own vehicle position on the road map. The locator unit 12 may include a locator calculator 13 that estimates the own vehicle position on the road map. To an input side of the locator calculator 13, various sensors, such as an acceleration sensor 14, a wheel speed sensor 15, a gyroscope sensor 16, and a GNSS receiver 17, that are necessary to calculate the position coordinates of the own vehicle M may be coupled. The acceleration sensor 14 may detect the acceleration rate of the own vehicle M. The wheel speed sensor 15 may detect the rotation speeds of front, rear, left, and right wheels. The gyroscope sensor 16 may detect the angular speed or the angular acceleration rate of the own vehicle M. The GNSS receiver 17 may receive positioning signals from a plurality of positioning satellites 50.

To the locator calculator 13, a transceiver 18 may be coupled. The transceiver 18 may send and receive information to/from a non-illustrated base station (i.e., establish a road-to-vehicle communication). Additionally, the locator calculator 13 may send and receive information to/from other vehicles (i.e., establish an inter-vehicle communication).

To the locator calculator 13, a high-definition road map database 19 may also be coupled. The high-definition road map database 19 may be a mass storage medium, such as a HDD, that stores a high-definition road map data (i.e., a dynamic map). For example, the high-definition road map data may have three information layers: static information mainly including road information, quasi-dynamic information mainly including traffic information, and dynamic information mainly including traffic information.

The static information may include data on roads and structures on roads, data on lanes, data on road surfaces, data on permanent traffic regulations, and so forth that need to be updated every month or more frequently.

The quasi-dynamic information may include data on actual traffic congestion statuses or traveling regulations at a measurement time, data on fallen objects or obstacles, data on temporary traveling trouble statuses, data on the statuses of accidents actually happened, data on narrow-range weather, and so forth that need to be updated every minute or more frequently.

The dynamic information may include data transmitted or exchanged between mobile objects, data on signals being currently indicated, data on pedestrians and two-wheel vehicles present at intersections, data on vehicles traveling straight through intersections, and so forth that need to be updated every second or more frequently. These information layers of the road map data may be compared with the traveling environment information acquired by the camera unit 11 of the own vehicle M and the traveling environment information received by the transceiver 18 via the road-to-vehicle communication or the inter-vehicle communication, and may be updated as needed.

The locator calculator 13 may include a map information acquisition section 13*a*, a second traveling environment recognition section 13*b*, and an imaging mode switching section 13*c*.

The map information acquisition section 13*a* may calculate position information on the position coordinates (absolute coordinates) of the own vehicle M on the basis of the positioning signals transmitted from the positioning satellites 50 to the GNSS receiver 17.

In a case where the positioning signals are received from the positioning satellites 50 at a long cycle, the map information acquisition section 13*a* may complement the position coordinates identified on the basis of the positioning signals with the signals received from the acceleration sensor 14, the wheel speed sensor 15, and the gyroscope sensor 16, for example. For example, the map information acquisition section 13*a* may calculate the movement amount of the own vehicle M on the basis of the signals received from the acceleration sensor 14, the wheel speed sensor 15, and the gyroscope sensor 16, calculate a traveling track of the own vehicle M from the movement amount, and calculate the positional coordinates of the own vehicle M on the basis of the traveling track. In this way, the map information acquisition section 13a may complement the position coordinates of the own vehicle M identified on the basis of the positioning signals.

Thereafter, the map information acquisition section 13a may retrieve the road map data on a predetermined range determined on the basis of the calculated position coordinates of the own vehicle M from the high-definition road map database 19 as needed.

The second traveling environment recognition section 13b may perform map matching of the position coordinates of the own vehicle M in the real space calculated by the map information acquisition section 13a on the road map data to estimate the position of the own vehicle M on the road map.

When the stereo camera is switched to the high-speed imaging mode by an imaging mode switching section 13c described below, the map information acquisition section 13a may calculate the traveling track of the own vehicle M from the movement amount of the own vehicle M calculated by the first traveling environment recognition section 11d on the basis of the optical flows. The map information acquisition section 13a may then estimate the own vehicle position on the road map on the basis of the traveling track.

Additionally, when the stereo camera is switched to the high-speed imaging mode by the imaging mode switching section 13c described below, the map information acquisition section 13a may correct the own vehicle position on the road map on the basis of the first traveling environment information as needed.

Thereafter, the second traveling environment recognition section 13b may recognize traveling environment information on the traveling environment surrounding the own vehicle M on the basis of the estimated own vehicle position on the road map. In one embodiment, the traveling environment information acquired by the second traveling environment recognition section 13b may serve as "second traveling environment information". Note that, at the time of recognition of the second traveling environment information, the own vehicle position estimated (and corrected) in the high-speed imaging mode may be used preferentially over the own vehicle position on the road map estimated on the basis of the positioning signals.

For example, the second traveling environment information acquired by the second traveling environment recognition section 13b on the basis of the road map data may include the information on the left and right lane dividing lines that define the own vehicle traveling road (or the own vehicle traveling lane) therebetween, and the road curvature of the middle of the own vehicle traveling lane.

Additionally, the second traveling environment information acquired by the second traveling environment recognition section 13b from the road map data may include the type of the own vehicle traveling road.

The imaging mode switching section 13c switches the stereo camera in the camera unit 11 between the normal imaging mode and the high-speed imaging mode. The switching control may be performed depending on the level of the positioning accuracy in estimating the own vehicle position on the basis of the positioning signals received from the positioning satellites 50. In one embodiment, the imaging mode switching section 13c may serve as an "imaging mode switching unit".

For example, when the positioning accuracy in estimating the own vehicle position on the basis of the positioning signals is assessed to be high, the imaging mode switching section 13c drives the stereo camera of the camera unit 11 in the normal imaging mode. In contrast, when the positioning accuracy in estimating the own vehicle position on the basis of the positioning signals is assessed to be low, the imaging mode switching section 13c drives the stereo camera of the camera unit 11 in the high-speed imaging mode.

The positioning accuracy may be assessed on the basis of the number of positioning signals received from the positioning satellites 50. For example, in a case where the number of positioning signals transmitted from the positioning satellites 50 to the GNSS receiver 17 is a predetermined number (e.g., five) or greater, the imaging mode switching section 13c may determine that the positioning accuracy is high. In contrast, in a case where the number of positioning signals transmitted from the positioning satellites 50 to the GNSS receiver 17 is less than the predetermined number, the imaging mode switching section 13c may determine that the positioning accuracy is low. Note that, the number of positioning signals transmitted from the positioning satellites 50 indicates the number of the satellites 50 from which the GNSS receiver 17 can receive the positioning signals. The number of positioning signals transmitted from the positioning satellites 50 is generally called a number of visible satellites.

Further, the positioning accuracy may be assessed on the basis of a comparison between the first traveling environment information and the second traveling environment information, for example. For instance, the imaging mode switching section 13c may compare the distance from the own vehicle M to a road mark (e.g., a lane dividing line or stop line) acquired as the first traveling environment information with the distance from the own vehicle M to the road mark acquired as the second traveling environment information. If the difference between the distances is less than a predetermined value, the imaging mode switching section 13c may determine that the positioning accuracy is high. In contrast, if the difference is equal to or greater than the predetermined value, the imaging mode switching section 13c may determine that the positioning accuracy is low.

Comprehensively taking the results of the assessment into consideration, the imaging mode switching section 13c switches the stereo camera of the camera unit 11 between the normal imaging mode and the high-speed imaging mode. For example, in a case where both the positioning accuracy assessed on the basis of the number of positioning signals and the positioning accuracy assessed on the basis of the comparison between the first traveling environment information and the second traveling environment information are high, the imaging mode switching section 13c may drive the stereo camera of the camera unit 11 in the normal imaging mode. In contrast, in a case where at least one of the positioning accuracy assessed on the basis of the number of positioning signals or the positioning accuracy assessed on the basis of the comparison between the first traveling environment information and the second traveling environment information is low, the imaging mode switching section 13c may drive the stereo camera of the camera unit 11 in the high-speed imaging mode.

In one embodiment, the map information acquisition section 13a and the second traveling environment recognition section 13b may serve as a "second traveling environment recognition unit".

The first traveling environment information acquired by the first traveling environment recognition section 11d of the camera unit 11 and the second traveling environment information acquired by the second traveling environment recognition section 13b of the locator unit 12 may be read by a traveling ECU 22. To an input side of the traveling ECU 22, non-illustrated various sensors such as a mode switch, a steering torque sensor, a brake sensor, an accelerator sensor, and a yaw rate sensor may be coupled. The mode switch may be operated by the driver to turn on or off the automatic driving function (automatic traveling control). The steering torque sensor may detect a steering torque or the amount of driving operation performed by the driver. The brake sensor may detect the amount of driving operation performed by the driver on the brake pedal, i.e., the amount of depression of the brake pedal. The accelerator sensor may detect the amount of driving operation performed by the driver on the accelerator pedal, i.e., the amount of depression of the accelerator pedal. The yaw rate sensor may detect the yaw rate exerted on the own vehicle M.

The traveling ECU 22 may be switchable among the following drive modes: a manual drive mode, a first traveling control mode and a second traveling control mode set for achieving the traveling control, and an evacuation mode. These drive modes of the traveling ECU 22 may be selectively switched on the basis of the operational state of the mode switch.

The manual drive mode may be a drive mode in which the driver is required to hold the steering wheel. For example, in the manual drive mode, the own vehicle M may be caused to travel in accordance with a driver's driving operation, such as a steering operation and a brake operation.

Likewise, the first traveling control mode may be a drive mode in which the driver is required to hold the steering wheel. For example, the first traveling control mode may be a semi-automatic drive mode in which the own vehicle M is caused to travel along a target traveling route mainly under an appropriate combination of adaptive cruise control (ACC), active lane keep centering (ALKC) control, and active lane keep bouncing control that are implemented by an E/G ECU 23, a PS ECU 24, and a BK ECU 25, while a driver's driving operation is reflected.

The second traveling control mode may be an automatic drive mode in which the own vehicle M is caused to travel following a target route (a route map information) mainly under an appropriate combination of the ACC, the ALKC control, the active lane keep bouncing control that are implemented by the E/G ECU 23, the PS ECU 24, and the BK ECU 25, for example, without requiring the driver to perform a steering operation, an acceleration operation, nor a brake operation.

The evacuation mode may be a mode in which the own vehicle M is automatically stopped on a side strip in a case where the own vehicle M is no longer able to continue to travel in the second traveling control mode and where the driving operation cannot be taken over by the driver (i.e., when switchover to the manual drive mode or the first traveling control mode cannot be made).

Figure 3:
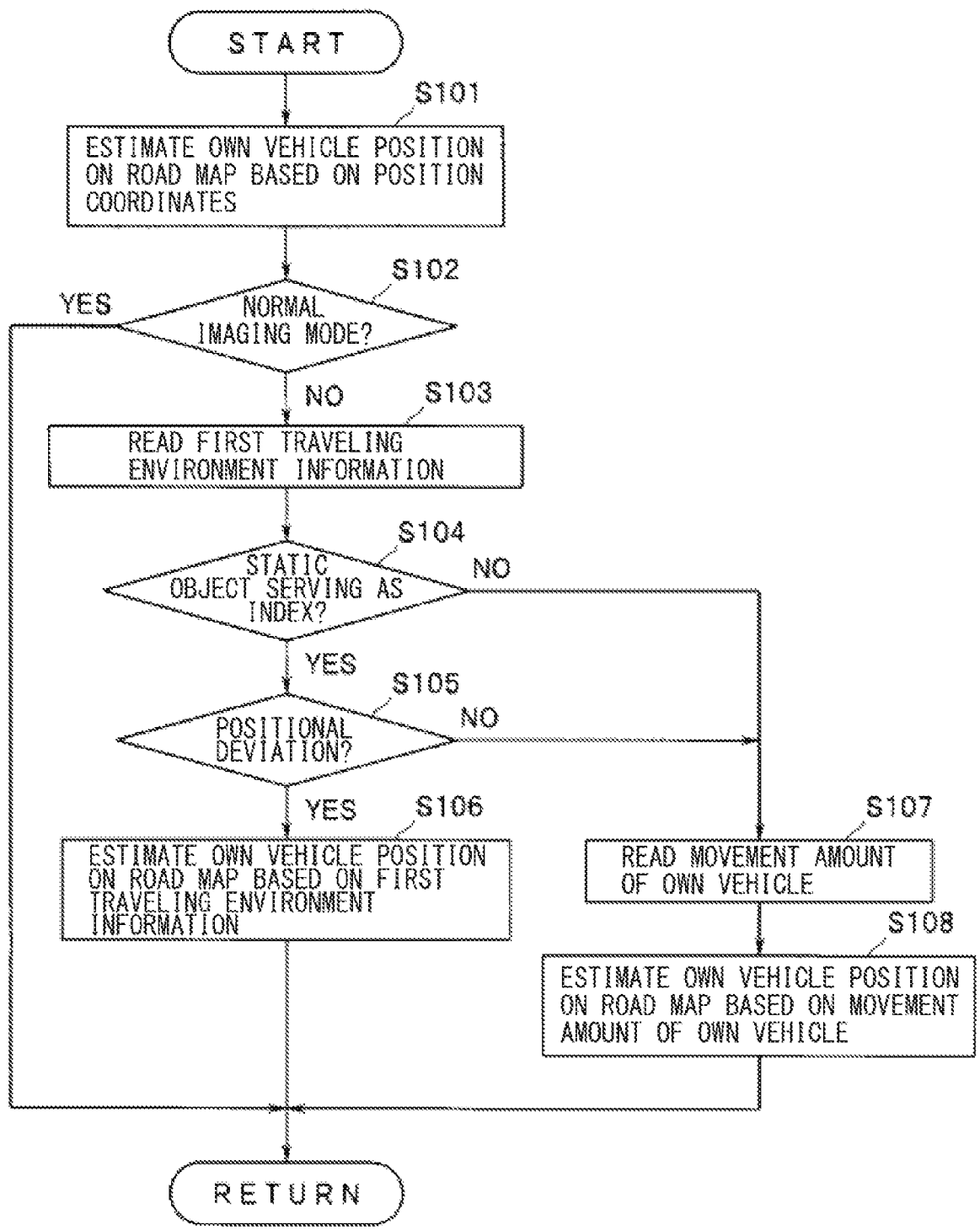
FIG. 3 is a flowchart illustrating an exemplary routine for estimating the position of the own vehicle.

An exemplary procedure performed by the second traveling environment recognition section 13b to estimate the own vehicle position on the road map will now be described with reference to an own vehicle position estimation routine illustrated in FIG. 3. This routine may be repeatedly executed every predetermined period of time.

When the routine starts, the second traveling environment recognition section 13b may estimate the own vehicle position on the road map by performing map matching of the position coordinates calculated on the basis of the positioning signals received from the positioning satellites 50 to the road map data (Step S101).

Thereafter, in Step S102, the second traveling environment recognition section 13b may determine whether the stereo camera of the camera unit 11 is driven in the normal imaging mode.

If the stereo camera of the camera unit 11 is determined to be driven in the normal imaging mode (Step S102: YES), the second traveling environment recognition section 13b may cause the procedure to exit from the routine.

In contrast, if the stereo camera of the camera unit 11 is determined to be driven in the high-speed imaging mode (Step S102: NO), the second traveling environment recognition section 13b may cause the procedure to proceed to Step S103. In Step S103, the second traveling environment recognition section 13b may read the first traveling environment information from the first traveling environment recognition section 11d of the camera unit 11.

Thereafter, in Step S104, the second traveling environment recognition section 13b may determine whether a static object serving as an index for estimating the own vehicle position is detected in the first traveling environment information. For example, the second traveling environment recognition section 13b may determine whether both a lane dividing line for estimating the lateral position of the own vehicle M on the road and a stop line for estimating the longitudinal position of the own vehicle M on the road are detected in the first traveling environment information.

If it is not determined in Step S104 that the static object serving as the index is detected (Step S104: NO), the second traveling environment recognition section 13b may cause the procedure to proceed to Step S107.

In contrast, if it is determined in Step S104 that the static object serving as the index is detected (Step S104: YES), the second traveling environment recognition section 13b may cause the procedure to proceed to Step S105. In Step S105, the second traveling environment recognition section 13b may compare the index detected in the first traveling environment information with an index detected in the second traveling environment information (i.e., the road map data) to determine whether a positional deviation is generated between the indices. For example, the second traveling environment recognition section 13b may determine whether an error or a positional deviation in the width direction of the own vehicle M is generated between the distance from the own vehicle M to the lane dividing line in the first traveling environment information and the distance from the own vehicle M to the lane dividing line in the second traveling environment information. Additionally, the second traveling environment recognition section 13b may determine whether an error or a positional deviation in the length direction of the own vehicle M is generated between the distance from the own vehicle M to the stop line in the first traveling environment information and the distance from the own vehicle M to the stop line in the second traveling environment information. If it is determined in Step S105 that no positional deviation is generated (Step S105: NO), the second traveling environment recognition section 13b may cause the procedure to proceed to Step S107.

In contrast, if it is determined in Step S105 that the positional deviation is generated (Step S105: YES), the second traveling environment recognition section 13b may cause the procedure to proceed to Step S106. In Step S106, the second traveling environment recognition section 13b may estimate (and correct) the own vehicle position on the road map on the basis of the first traveling environment information, and cause the procedure to exit from the routine. For example, the second traveling environment recognition section 13b may correct the own vehicle position on the road map such that the distance from the own vehicle M to the lane dividing line on the road map becomes equal to the distance from the own vehicle M to the lane dividing line in the first traveling environment information, for example. Additionally, the second traveling environment recognition section 13b may correct the own vehicle position on the road map such that the distance from the own vehicle M to the stop line on the road map becomes equal to the distance from the own vehicle M to the stop line in the first traveling environment information, for example. Note that, at the time of recognition of the second traveling environment information, the own vehicle position estimated in Step S106 as described above may be used preferentially over the own vehicle position estimated in Step S101.

When the procedure proceeds from Step S104 or Step S105 to Step S107, the second traveling environment recognition section 13b may read the movement amount of the own vehicle M from the first traveling environment recognition section 11d.

Thereafter, in Step S108, the second traveling environment recognition section 13b may estimate the own vehicle position on the road map on the basis of the movement amount of the own vehicle M, and cause the procedure to exit from the routine. For example, the second traveling environment recognition section 13b may first determine the traveling track of the own vehicle M on the basis of the movement amount of the own vehicle M. Thereafter, the map information acquisition section 13a may estimate the own vehicle position on the road map on the basis of the traveling track of the own vehicle M. Note that, at the time of recognition of the second traveling environment information, the own vehicle position estimated in Step S107 as described above may be used preferentially over the own vehicle position estimated in Step S101.

Figure 4:
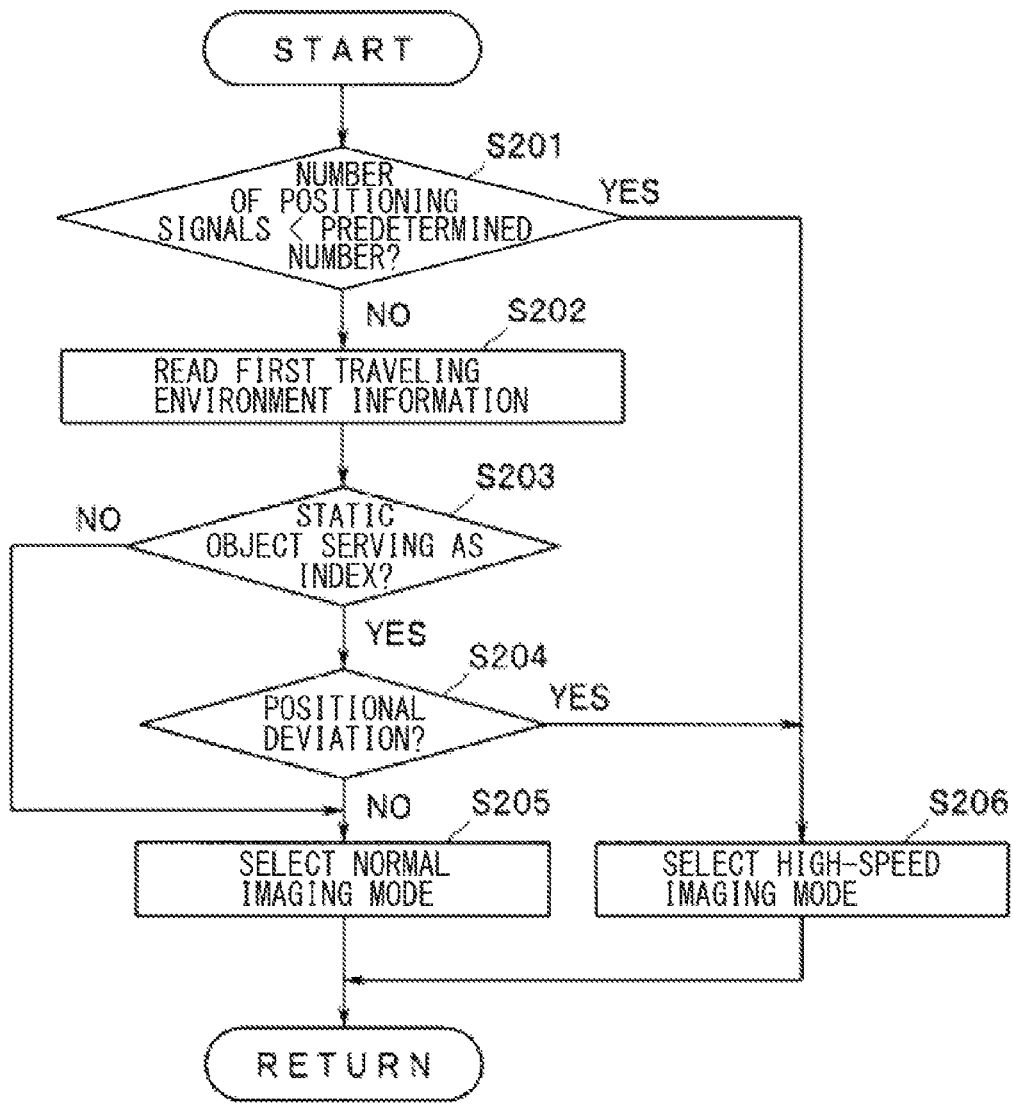
FIG. 4 is a flowchart illustrating an exemplary routine for switching imaging modes.

An exemplary procedure performed by the imaging mode switching section 13c to switch the imaging mode will now be described with reference to an imaging mode switching control routine illustrated in FIG. 4. This routine may be repeatedly executed every predetermined period of time.

When the routine starts, the imaging mode switching section 13c may determine in Step S201 whether the number of positioning signals transmitted from the positioning satellites 50 to the GNSS receiver 17 is less than a predetermined number (e.g., five).

If it is determined in Step S201 that the number of positioning signals is less than the predetermined number (Step S201: YES), the imaging mode switching section 13c may determine that the positioning accuracy in estimating the own vehicle position on the basis of the positioning signals is low, and cause the procedure to proceed to Step S206.

In contrast, if it is determined in Step S201 that the number of positioning signals is equal to or greater than the predetermined number (Step S201: NO), the imaging mode switching section 13c may cause the procedure to proceed to Step S202. In Step S202, the imaging mode switching section 13c may read the first traveling environment information from the first traveling environment recognition section 11d of the camera unit 11.

Thereafter, in Step S203, the imaging mode switching section 13c may determine whether a static object serving as an index for estimating the own vehicle position is detected in the first traveling environment information.

If it is determined in Step S203 that no static object serving as the index is detected (Step S203: NO), the imaging mode switching section 13c may cause the procedure to proceed to Step S205.

In contrast, if it is determined in Step S203 that the static object serving as the index is detected (Step S203: YES), the imaging mode switching section 13c may cause the procedure to proceed to Step S204. In Step S204, the imaging mode switching section 13c may compare the index detected in the first traveling environment information with the index detected in the road map based on the own vehicle position estimated in Step S101 described above to determine whether a positional deviation is generated between the indices. For example, the imaging mode switching section 13c may determine whether an error is generated between the distance from the own vehicle M to the lane dividing line in the first traveling environment information and the distance from the own vehicle M to the lane dividing line on the road map. Additionally, the imaging mode switching section 13c may determine whether an error is generated between the distance from the own vehicle M to the stop line in the first traveling environment information and the distance from the own vehicle M to the stop line on the road map.

If it is determined in Step S204 that no positional deviation is generated (Step S204: NO), the imaging mode switching section 13c may determine that the positioning accuracy in estimating the own vehicle position on the basis of the positioning signals is not lowered, and cause the procedure to proceed to Step S205.

In contrast, if it is determined in Step S204 that the positional deviation is generated (Step S204: YES), the imaging mode switching section 13c may determine that the positioning accuracy in estimating the own vehicle position on the basis of the positioning signals is lowered, and cause the procedure to proceed to Step S206.

When the procedure proceeds from Step S203 or Step S204 to Step S205, the imaging mode switching section 13c may select the normal imaging mode as the imaging mode of the stereo camera of the camera unit 11, and cause the procedure to exit from the routine.

When the procedure proceeds from Step S201 or Step S204 to Step S206, the imaging mode switching section 13c may select the high-speed imaging mode as the imaging mode of the stereo camera of the camera unit 11, and cause the procedure to exit from the routine.

Accordingly, when the positioning accuracy in estimating the own vehicle position on the basis of the positioning signals is not lowered, the stereo camera is driven in the normal imaging mode. In contrast, when the positioning accuracy in estimating the own vehicle position on the basis of the positioning signals is lowered, the stereo camera is driven in the high-speed mode.

According to the foregoing example embodiments, the traveling environment recognition apparatus 10 includes the stereo camera (i.e., the main camera 11a and the sub-camera 11b), the first traveling environment recognition section 11d, the second traveling environment recognition section 13b, and the imaging mode switching section 13c. The stereo camera (i.e., the main camera 11a and the sub-camera 11b) is driven in the normal imaging mode or the high-speed imaging mode, and captures an image of the traveling environment surrounding the own vehicle M. The first traveling environment recognition section 11d acquires the first traveling environment information on the basis of the image captured by the stereo camera, an calculates the movement amount of the own vehicle M on the basis of the optical flows in the image. The second traveling environment recognition section 13b calculates the position coordinates of the own vehicle M in the real space on the basis of the positional signals received from the positioning satellites 50, estimates the position of the own vehicle M on the road map on the basis of the position coordinates, and acquires the second traveling environment information from the road map data. The imaging mode switching section 13c assesses the positioning accuracy based on the positioning signals. When the positioning accuracy is high, the imaging mode switching section 13c drives the stereo camera in the normal imaging mode. When the positioning accuracy is low, the imaging mode switching section 13c drives the stereo camera in the high-speed imaging mode. When the stereo camera is driven in the high-speed imaging mode, the second traveling environment recognition section 13b estimates the position of the own vehicle M on the road map on the basis of the movement amount of the own vehicle calculated on the basis of the optical flows. Accordingly, it is possible to estimate the position of the own vehicle M on the road map with high accuracy even when the positioning accuracy in estimating the position of the own vehicle M on the basis of the positioning signals received from the positioning satellites is lowered.

In the foregoing example embodiments, the imaging mode switching section 13c drives the stereo camera in the high-speed imaging mode when the positioning accuracy based on the positioning signals is lowered. This enables continuous imaging of an identical static object over many frames, and high-accuracy calculation of the movement amount of the own vehicle M based on the optical flows. On the basis of the movement amount of the own vehicle M calculated with high accuracy, the traveling track of the own vehicle M is determined to estimate the position of the own vehicle on the road map. Accordingly, it is possible to estimate the position of the own vehicle M on the road map with high accuracy even when the positioning accuracy in estimating the position of the own vehicle M on the basis of the positioning signals received from the positioning satellites 50 is lowered. This allows the second traveling environment information including the road map data to be acquired with high accuracy, maintaining the traveling control of the own vehicle M at a high level.

Unlike calculations by means of the wheel speed sensor or the gyroscope sensor, the calculation of the movement amount of the own vehicle M based on the optical flows eliminates the need for taking the influence of skidding of the own vehicle M into consideration, for example. Thus, it is possible to suppress an accumulation of errors during the estimation of the own vehicle position even in the case of long distance traveling.

Further, according to at least one of the foregoing example embodiments, the position of the own vehicle on the road map may be corrected as appropriated on the basis of the first traveling environment information when the positioning accuracy based on the positioning signals is lowered. This maintains the positioning accuracy in estimating the own vehicle position on the road map at a high level.

According to the foregoing example embodiments, the stereo camera is driven in the high-speed imaging mode only when the positioning accuracy based on the positioning signals is lowered. This reduces the calculation loads on the first traveling environment recognition section 11d, and reduces adverse effects on the first traveling environment recognition section 11d and so forth, such as heating of the first traveling environment recognition section 11d, compared with the case in which the stereo camera is always driven in the high-speed imaging mode.

In at least one of the foregoing example embodiments, the first traveling environment recognition section 11d, the locator calculator 13, the traveling ECU 22, the E/G ECU 23, the PS ECU 24, the BK ECU 25, and so forth may each include a known microcomputer having a CPU, a RAM, a ROM, a non-volatile memory, and so forth, and peripheral devices. The ROM may preliminarily store programs to be executed by the CPU and fixed data such as data tables, for example. Some or all functions of the processor may be implemented by logic circuitry or analog circuitry. Additionally, the processing of various programs may be implemented by electronic circuitry such as an FPGA.

One or more of the first traveling environment recognition section 11d, the map information acquisition section 13a, the second traveling environment recognition section 13b, and the imaging mode switching section 13c illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first traveling environment recognition section 11d, the map information acquisition section 13a, the second traveling environment recognition section 13b, and the imaging mode switching section 13c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first traveling environment recognition section 11d, the map information acquisition section 13a, the second traveling environment recognition section 13b, and the imaging mode switching section 13c illustrated in FIG. 1.

The example embodiments described above may be non-limiting examples and may be modified in various ways without departing from the gist of the technology.

The invention claimed is:

1. A traveling environment recognition apparatus to be applied to a vehicle, the traveling environment recognition apparatus comprising:
a camera configured to have a first imaging mode having a first non-zero frame rate and a second imaging mode having a second non-zero frame rate that is higher than the frame rate of the first imaging mode, and capture an image of a traveling environment surrounding the vehicle;
an imaging mode switching unit configured to:
assess positioning accuracy of a position of the vehicle that is estimated based on positioning signals received from positioning satellites;
drive the camera in the first imaging mode in response to assessing that the positioning accuracy is a first accuracy level; and
drive the camera in the second imaging mode in response to assessing that the positioning accuracy is a second accuracy level that is lower accuracy than the first accuracy level; and
a first traveling environment recognition unit configured to:
acquire first traveling environment information on the traveling environment surrounding the vehicle based on the image captured by the camera that is in either the first imaging mode or the second imaging mode; and calculate a movement amount of the vehicle based on an optical flow in the image;
a second traveling environment recognition unit configured to:
calculate position coordinates of the vehicle in a real space based on positioning signals received from positioning satellites;
in response to determining that the camera is in the first imaging mode, estimate a position of the vehicle on a road map based on the position coordinates;
in response to determining that the camera is in the second imaging mode, estimate the position of the vehicle on the road map based on the movement amount of the vehicle obtained based on the optical flow; and
acquire second traveling environment information on the traveling environment surrounding the vehicle from road map information.

2. The traveling environment recognition apparatus according to claim 1, wherein,
in response to determining that the camera is in the second imaging mode, the second traveling environment recognition unit is configured to correct the position of the vehicle on the road map based on the first traveling environment information.

3. The traveling environment recognition apparatus according to claim 1, wherein
the imaging mode switching unit is configured to determine that the positioning accuracy is low in a case where a number of the positioning signals received from the positioning satellites is less than a predetermined value.

4. The traveling environment recognition apparatus according to claim 2, wherein
the imaging mode switching unit is configured to determine that the positioning accuracy is low in a case where a number of the positioning signals received from the positioning satellites is less than a predetermined value.

5. The traveling environment recognition apparatus according to claim 1, wherein
the imaging mode switching unit is configured to determine that the positioning accuracy is low in a case where a predetermined error equal to or greater than a predetermined value is generated between the first traveling environment information and the second traveling environment information.

6. The traveling environment recognition apparatus according to claim 2, wherein
the imaging mode switching unit is configured to determine that the positioning accuracy is low in a case where a predetermined error equal to or greater than a predetermined value is generated between the first traveling environment information and the second traveling environment information.

7. The traveling environment recognition apparatus according to claim 1, wherein the imaging mode switching unit is further configured to:
determine whether a number of the positioning signals received from the positioning satellites is less than a predetermined value;
determine whether a predetermined error equal to or greater than a predetermined value is generated between the first traveling environment information and the second traveling environment information;
in response to determining that (1) the number of the positioning signals received from the positioning satellites is not less than a predetermined value, and (2) the predetermined error equal to or greater than a predetermined value is not generated between the first traveling environment information and the second traveling environment information, drive the camera in the first imaging mode; and
in response to determining that (1) the number of the positioning signals received from the positioning satellites is less than a predetermined value or (2) the predetermined error equal to or greater than a predetermined value is generated between the first traveling environment information and the second traveling environment information, drive the camera in the second imaging mode.

8. The traveling environment recognition apparatus according to claim 2, wherein the imaging mode switching unit is further configured to:
determine whether a number of the positioning signals received from the positioning satellites is less than a predetermined value;
determine whether a predetermined error equal to or greater than a predetermined value is generated between the first traveling environment information and the second traveling environment information;
in response to determining that (1) the number of the positioning signals received from the positioning satellites is not less than a predetermined value, and (2) the predetermined error equal to or greater than a predetermined value is not generated between the first traveling environment information and the second traveling environment information, drive the camera in the first imaging mode; and
in response to determining that (1) the number of the positioning signals received from the positioning satellites is less than a predetermined value or (2) the predetermined error equal to or greater than a predetermined value is generated between the first traveling environment information and the second traveling environment information, drive the camera in the second imaging mode.

9. A traveling environment recognition apparatus to be applied to a vehicle, the traveling environment recognition apparatus comprising:
a camera configured to have a first imaging mode having a first non-zero frame rate and a second imaging mode having a second non-zero frame rate that is higher than the frame rate of the first imaging mode, and capture an image of a traveling environment surrounding the vehicle; and
circuitry configured to:
assess positioning accuracy of a position of the vehicle that is estimated based on positioning signals received from positioning satellites;
drive the camera in the first imaging mode in response to assessing that the positioning accuracy is a first accuracy level;
drive the camera in the second imaging mode in response to assessing that the positioning accuracy is a second accuracy level that is lower accuracy than the first accuracy level; and
acquire first traveling environment information on the traveling environment surrounding the vehicle based on the image captured by the camera that is in either the first imaging mode or the second imaging mode;
calculate a movement amount of the vehicle based on an optical flow in the image;

calculate position coordinates of the vehicle in a real space based on positioning signals received from positioning satellites;

in response to determining that the camera is in the first imaging mode, estimate a position of the vehicle on a road map on a basis of based on the position coordinates;

in response to determining that the camera is in the second imaging mode, estimate the position of the vehicle on the road map based on the movement amount of the vehicle obtained based on the optical flow; and acquire second traveling environment information on the traveling environment surrounding the vehicle from road map information.

* * * * *